United States Patent
Farr et al.

(10) Patent No.: US 8,271,526 B2
(45) Date of Patent: Sep. 18, 2012

(54) CONTENT PROVISIONING METHOD AND SYSTEM

(75) Inventors: Jeffery R Farr, Suffolk (GB); Ben Strulo, Suffolk (GB)

(73) Assignee: British Telecommunications public limited company, London (GB)

( * ) Notice: Subject to any disclaimer, the term of this patent is extended or adjusted under 35 U.S.C. 154(b) by 1085 days.

(21) Appl. No.: 10/591,349

(22) PCT Filed: Feb. 18, 2005

(86) PCT No.: PCT/GB2005/000581
§ 371 (c)(1),
(2), (4) Date: Aug. 31, 2006

(87) PCT Pub. No.: WO2005/086043
PCT Pub. Date: Sep. 15, 2005

(65) Prior Publication Data
US 2007/0192321 A1   Aug. 16, 2007

(30) Foreign Application Priority Data

Mar. 8, 2004  (GB) .................................. 0405183.5
Jun. 17, 2004  (GB) .................................. 0413621.4

(51) Int. Cl.
*G06F 7/00* (2006.01)
(52) U.S. Cl. ........ 707/783; 707/740; 707/758; 707/812; 707/827
(58) Field of Classification Search ............... 707/9, 10, 707/104.1
See application file for complete search history.

(56) References Cited

U.S. PATENT DOCUMENTS

| | | | | |
|---|---|---|---|---|
| 5,748,896 A | * | 5/1998 | Daly et al. | ..................... 709/223 |
| 6,076,100 A | | 6/2000 | Cottrille et al. | |
| 6,493,703 B1 | | 12/2002 | Knight et al. | |
| 2002/0156917 A1 | * | 10/2002 | Nye | ............................... 709/238 |
| 2002/0178255 A1 | | 11/2002 | Hobart | |
| 2003/0009570 A1 | | 1/2003 | Moskowitz et al. | |

FOREIGN PATENT DOCUMENTS

EP   1229442 A2   8/2002
(Continued)

OTHER PUBLICATIONS

"A Reputation System for Peer-to-Peer Networks" Minaxi Gupta, Paul Judge, Mostafa Ammar as presented an NOSSDAV 2003, Jun 1-3.*

(Continued)

*Primary Examiner* — Etienne Leroux
*Assistant Examiner* — Bruce Witzenburg
(74) *Attorney, Agent, or Firm* — Nixon & Vanderhye P.C.

(57) ABSTRACT

Content items or data defining access to content items for provision to one or more users is respectively maintained. Respective content access data for those users from which content items or data defining access to content items are received is changed and a sub-set of the content items or data defining access to content items is provided to a user, the members of the sub-set being determined in dependence on the content access data of the user. Each content item or set of data defining access to a content item has a property having a value, and the content access data includes a content access value relating to the property, wherein the sub-set of the content items or data defining access to content items is determined in dependence on the respective values.

33 Claims, 11 Drawing Sheets

FOREIGN PATENT DOCUMENTS

| | | |
|---|---|---|
| JP | 2003-150804 | 5/2003 |
| WO | WO 98/53387 | 11/1998 |
| WO | WO 01/22292 A2 | 3/2001 |
| WO | WO 01/27773 A1 | 4/2001 |
| WO | WO 01/84799 A2 | 11/2001 |
| WO | WO 03/001296 A2 | 1/2003 |

OTHER PUBLICATIONS

NOSSDAV 2003 web page (http://www.nossdav/2003.*
"Incentives Build Robustness in BitTorrent" Bram Cohen, May 22, 2003.*
A Frequent-Sharer Program for Peer-to-Peer Systems Minaxi Gupta, Paul Judge, Mostafa Ammar as archived Sep. 10, 2003 http://web.archive.org/web/20030910235549/http://www.cc.gatech.edu/grads/g/Minaxi.Gupta/pubs/tr-incentives.pdf.*
UK Search Reports dated May 20, 2004 and May 28, 2004.
Vassileva et al., "Can Peer-to-Peer File Sharing be of Help for Research Communities?".
Dutta et al., "The Design of a Distributed Rating System for Peer-to-Peer Systems".
Vishnumurthy et al., "KARMA: A Secure Economic Framework for Peer-to-Peer Resource Sharing".
Gupta et al., "A Frequent-Sharer Program for Peer-to-Peer Systems".
Lui et al., "Participation Inventive Mechanism in Peer-to-Peer Subscription Systems".
Yu et al., "Incentive Mechanisms for Agent-Based Peer-to-Peer Systems".
Moreton et al., "Trading in Trust, Tokens and Stamps".
Golle et al., Incentives for Sharing in Peer-to-peer Networks.
Anagnostakis et al., "Exchange-based Incentive Mechanisms for Peer-to-Peer File Sharing".

* cited by examiner

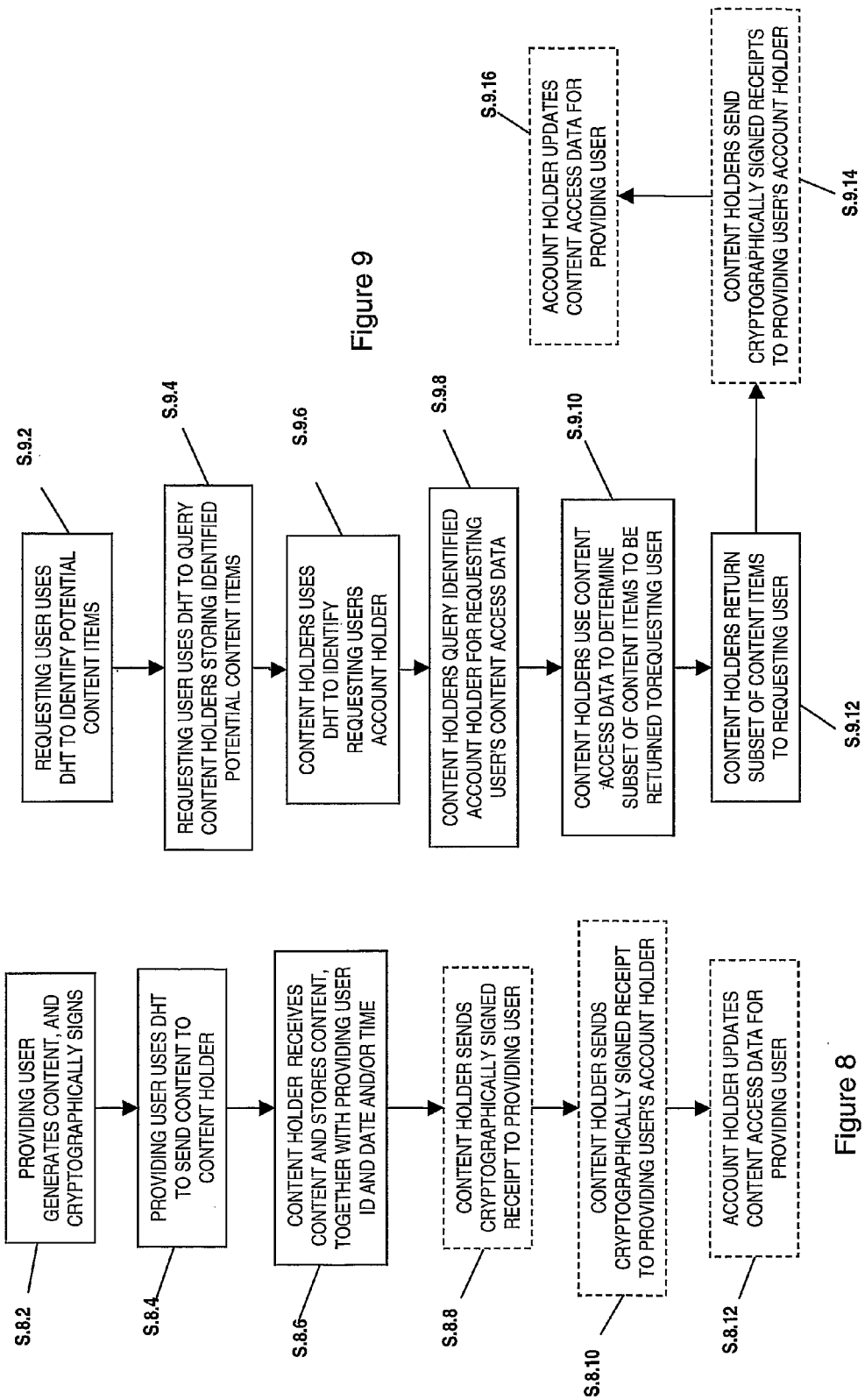

CONTENT PROVISIONING METHOD AND SYSTEM

This application is the US national phase of international application PCT/GB2005/000581 filed 18 Feb. 2005 which designated the U.S. and claims benefit of GB 0405183.5; GB 0413621.4, dated 8 Mar. 2004; Jun. 17, 2004, respectively, the entire content of which is hereby incorporated by reference.

TECHNICAL FIELD

The present invention relates to a content provisioning method and system for providing content items to users. In particular the content accessible by any particular user is dependent upon the content which the user herself makes available to other users.

BACKGROUND TO THE INVENTION AND PRIOR ART

The widespread use of internet-based technologies has made available more content to more users than ever before. Moreover, the capability of individual users to provide content which is then accessible via the internet to many other users is also a further effect of the widespread use of the internet. Such user provided content need not only be by way of a user providing and maintaining her own web page or the like, but may also be provided by users providing content to existing websites, newsgroups, bulletin boards or the like, which content may then be accessed by other users. Such content provision systems are a form of peer to peer (P2P) system.

It is possible to identify three general classes of P2P systems:
i) where service is provided by individual peers, and is generally consumed by other peers such that service provision and remuneration is inherently pairwise. Prior art examples of such peer to peer services are Gnutella (see www.gnutella.com) and Kazaa (see www.kazaa.com).
ii) where service is provided by a group of peers (eg fragmented file downloads, such as http://bitconjurer.org/bitTorrent); and
iii) another in which service is effectively provided by the entire group of peers ('emergent service provision', ESP), and is, potentially, effectively consumed by all peers. Examples of such systems are newsgroups, review websites, bulletin boards or the like.

Within the first and second classes of P2P network mentioned above the problem has been identified that some peers provide a great many of the content items available for download, whilst the majority of users share little or no files. Vishnumurthy et al in Karma: *A Secure Economic Framework for Peer-to Peer Resource Sharing* Procs Workshop on the Economics of Peer-to-Peer Systems, Berkeley, Calif., June 2003 report that 20 to 40% of Napster and almost 70% of Gnutella peers share little or no files, and comment that this is unsurprising as there is little incentive for peers to contribute resources. Vishnumurthey et al further describe a proposed framework to address this problem, where each peer has single scalar value referred to as Karma, which is increased as resources are contributed, and decreased when resources are consumed. In order to be able to download a file, therefore, the peer must have sufficient Karma in its "account" to be able to afford the download.

A similar system addressing the same problem is described by Gupta et al in *A Frequent-Sharer Program for Peer-to-Peer Systems*, downloadable from http://www.cc.gatech.edu/grads/g/Minaxi.Gupta/pubs/tr-incentives.pdf. Here, peers earn points as they serve content, and a peer is subsequently provided a level of service (LoS) based on the number of points she earns in the system. In order to ensure that peers continue to serve content even after earning points and becoming eligible for an enhanced level of service, points earned by a peer expire periodically. Hence, peers have to keep contributing to the system in order to retain or upgrade their LoS.

However, the same problem of encouraging contributions also exists in the ESP P2P system, such as a newsgroup. Generally newsgroups function by members posting newsworthy information, or by asking a question and having others respond to that question. The economic structure is therefore that peers make contributions to the community, and all members of the community then receive benefit. A strong characteristic is that the inherent cost of contributing is very high, whilst the cost of consumption is minimal. Even the cost of repeated acts of consumption is minimal.

Typically, the real utility of such an application (to end users) generally comes from the combination of the initial question, and public answers to that question—ie it is an emergent property, with service effectively provided by the entire group of peers. Many members of the community (potentially, at least) receive benefit from the discussion. As mentioned previously, there are many similar situations with this characteristic, especially those in which the contribution is human-generated content (which inherently has very high costs), such as websites which provide user reviews.

The present invention aims to address the above described problem of incentivising contributions particularly, although not exclusively, in peer to peer systems with emergent service provision attributes.

SUMMARY OF THE INVENTION

The present invention addresses the problem outlined above by providing a content provision method and system which maintains, for each user, content access data which defines the amount of access each user has to available content. To incentivise contributions of content the content access data is changed whenever a contribution is made by a user, such that the amount of access a user has to content is dependent upon the contributions made by the user in serving content or providing new content. In preferred embodiments, the degree of change of the content access data is dependent upon peer review values assigned to content made available by a user by the other users. The invention is suitable for implementation in a distributed manner using peer to peer technology, or in a centralised manner using a traditional client server architecture.

In view of the above, from a first aspect there is provided a content item provisioning method, comprising the steps:

storing content items or data defining access to content items for provision to users;

maintaining, for one or more users, respective content access data usable to determine which content items or data defining access to content items may be provided to respective users;

receiving content items or data defining access to content items from users for provision to users;

changing the respective content access data for those users from which content items or data defining access to content items are received; and providing a sub-set of the content items or data defining access to content items to a user, the members of the sub-set being determined in dependence on the content access data of the user.

The invention provides the effect that access to content is limited in dependence on the content access data for each user, which itself is dependent upon each user making contributions of content to the system. It is thought that such operation will incentivise users to make contributions as each user will have the desire to see as much content as possible, which is only possible by making content contributions to change the respective content access data.

In one embodiment the content access data comprises a proportion value, wherein the sub-set of the content items or data defining access to content items corresponds to a proportion of the available content items or data defining access to content items substantially corresponding to the proportion value. Thus, a greater proportion of the available content can be provided to users whose content access data indicates that they have provided content than to those users whose content access data indicates that they have not provided content.

In a preferred embodiment, each content item or set of data defining access to a content item has a property having a value, and the content access data comprises a content access value relating to the property, wherein the sub-set of the content items or data defining access to content items is determined in dependence on the respective values. This allows for straightforward comparison of content with the content access data, thus providing for an easy sort of which content is to be provided to a user and which is not in response to a request therefor.

In a preferred embodiment, the property values and content access values are preferably times and/or dates. This allows the content access values to act as so-called "time horizons" defining the scope of content which may be accessible by a user based upon the date and/or time of the content.

Alternatively or additionally, within the preferred embodiment the property values and content access values are geographical values. This allows the content access values to act as so-called "space horizons" defining the scope of content which may be accessible by a user based upon the location of storage of the content, or the location of the subject matter of the content.

Furthermore, alternatively or additionally the property values and content access values are quality values indicating a quality value given to particular content, for example based upon previous user reviews. This then allows the content access values to act as so-called "quality horizons" defining the scope of content which may be accessible by a user based upon the quality rating given to each piece of content.

Moreover, alternatively or additionally the property values and content access values are reputation values indicating a reputation value given to particular content based upon a reputation of the user who provided the content. For example, the reputation information may be derivable from previous user reviews of content provided by that same user. This then allows the content access values to act as so-called "reputation horizons" defining the scope of content which may be accessible by a user based upon the reputation rating given to the user who supplied each piece of content.

In other embodiments of the invention multiple sets of content items or data defining access to content items are stored, and respective content access data is maintained for each set of content items or data defining access to content items. This allows for user contributions to different sets of content or of content of different types to be accounted for separately, and access to the content of different types or of different sets to be controlled separately. In these other embodiments content access data for one set may be changed in dependence on the receipt from users of content items or data defining access to content items for that set, or alternatively the content access data for one set may be changed in dependence on the receipt from users of content items or data defining access to content items for another set or sets.

In the preferred embodiments preferably the content access values are changed so as to increase the content items or data defining access to content items provided in the sub-set. This ensures that the level of access to content enjoyed by a user always increases, and prevents problems whereby a user having accessed a particular content item is not then prevented in the future from accessing that content item again.

Within the embodiments the content access data may be changed in deterministic or non-deterministic ways. For example, in one embodiment the content access values are changed to give a fixed change in the content items or data defining access to content items with which the users are provided in the sub-set. Alternatively, in another embodiment there may further be provided the step of receiving rating data specifying a rating given to a content item by a user from one or more users, and the changing step comprises changing the content access value for the user from which the content item or data defining access to the content item which was rated was received in dependence on the received rating data. Such a deterministic method based on ratings received from other users incentivises users further to make good quality contributions.

In other embodiments the changing step further may comprise receiving requests for specific content items or data defining access to content items from users, and changing the content access value for the user from which the requested content item or data defining access to content was received. This allows for the content access data for users whose content has been requested by other users to be changed, thus rewarding those users who provided the requested content by allowing greater access themselves to the available content.

In further embodiments the changing step further comprises monitoring the time or date at which a first content item or data defining access to a content item is received in relation to the time or date a second content item or data defining access to a content item is received, and changing the content access value of the user from which the first content item or data defining access to a content item was received in dependence on the difference between the times and/or dates. Thus, for example, in a newsgroup application with this feature it becomes possible to reward timely responses (the first content item or data defining access to a content item) to questions (the second content item or data defining access to a content item) with a greater-change in the content access data of the user who responded in a timely manner than those users who responded in a less timely manner.

In other embodiments the changing step further comprises monitoring the time since the receipt of a content item or data defining access to a content item, and changing the content access value of the user from which the content item or data defining access to the content item was received in dependence on the monitored time. This allows greater credit to be given to a contributing user in the form of a change in content access data depending on the amount of time that user's content contribution stays available to other users.

In some embodiments there is optionally also provided the step of permitting a user to perform manipulations of the stored content items or data defining access to content items in dependence on the user's content access level. Thus, for example, a first user may edit or delete another user's content, provided that first user has sufficient access permission as defined by his content access data.

Some embodiments of the invention are preferably peer to peer based embodiments, wherein the method is collectively performed by at least a sub-set of peers within a peer to peer network. Other embodiments of the invention may be based on a client server architecture.

From a second aspect of the invention there is provided a content item provisioning system, comprising:

content storage arranged in use to store content items or data defining access to content items for provision to users;

data storage arranged in use to store, for one or more users, respective content access data usable to determine which content items or data defining access to content items may be provided to respective users;

first receiving means for receiving content items or data defining access to content items from users for provision to users;

a data processor arranged in use:

i) to change the respective content access data for those users from which content items or data defining access to content items are received; and ii) determine a sub-set of the content items or data defining access to content in dependence on the content access data of a user; and means for providing the determined sub-set to the user.

Within the second aspect the same advantages and further features and advantages as described above in respect of the first aspect may also be obtained, mutatis mutandis.

From a third aspect there is also provided a computer program or suite of computer programs so arranged such that when executed on a computer it/they cause(s) the computer to perform the method of any of the previously described aspects. Moreover, from a fourth aspect, there is also provided a computer readable storage medium arranged to store a computer program or at least one of a suite of computer programs according to the third aspect of the invention. The computer readable storage medium may be any magnetic, optical, magneto-optical, solid-state, or other storage medium capable of being read by a computer.

DESCRIPTION OF THE DRAWINGS

Further features and advantages of the present invention will become apparent from the following description of embodiments thereof, presented by way of example only, and by reference to the accompanying drawings, wherein like reference numerals refer to like parts, and wherein:

FIG. 8 is flow diagram illustrating the operation of part of the second embodiment of the present invention;

FIG. 9 is a flow diagram illustrating the operation of part of the second embodiment of the present invention;

DESCRIPTION OF THE EMBODIMENTS

Various embodiments of the invention will now be described. The embodiments of the invention to be described are primarily software based, using appropriate computer programs stored on and executed by computer systems. The individual computer systems used in the embodiments of the invention may perform different functions depending on the architecture of the particular embodiment. For example, some embodiments of the invention are based upon a client server architecture, wherein one of the computer systems functions as a server, and other of the computer systems function as clients, being served by the server. Other embodiments of the invention may use a peer to peer architecture, wherein each computer system performing the invention is a peer of every other, and may perform at least one or more functions in accordance with the embodiments of the invention for various others of its peers. Whichever architecture is adopted for a particular embodiment, it should be understood that the basic operating principles to allow communications between different computer systems are those known already in the art, whether client-server or peer-to-peer based.

In view of the above, a general outline of a general purpose computer system which may act as any of the computer systems to be described with respect to the specific embodiments will now be described, with reference to FIGS. 1 and 2.

Figure 1:
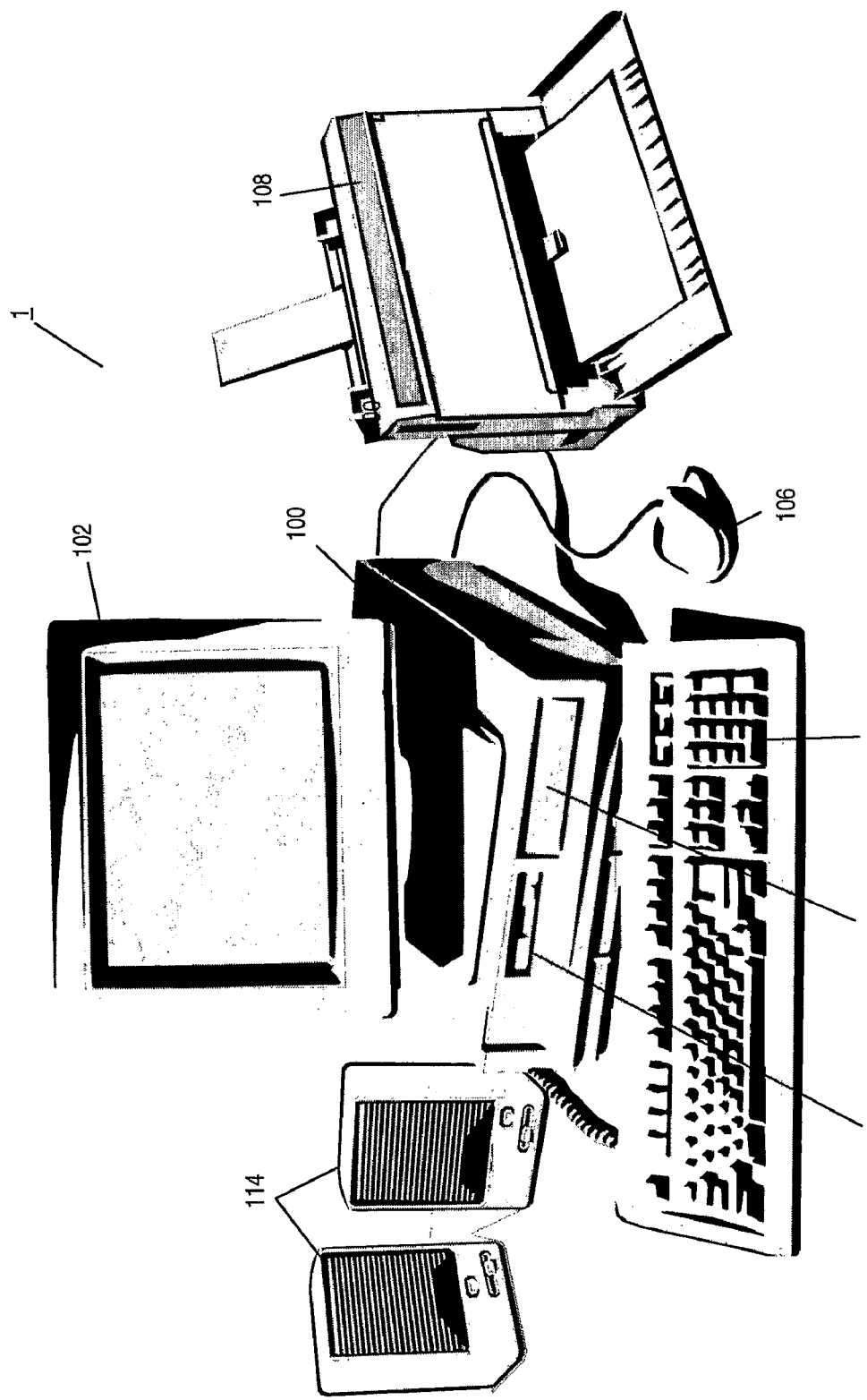
FIG. 1 illustrates a general purpose computer system which may be used in embodiments of the present invention.

FIG. 1 illustrates a general purpose computer system which provides the operating environment for computer systems used in embodiments of the present invention. Later, the operation of the invention will be described in the general context of computer executable instructions, such as program modules, being executed by these computer systems computer. Such program modules may include processes, programs, objects, components, data structures, data variables, or the like that perform tasks or implement particular abstract data types. Moreover, it should be understood by the intended reader that the invention may be embodied within other computer systems other than those shown in FIG. 1, and in particular hand held devices, notebook computers, main frame computers, mini computers, multi processor systems, distributed systems, etc. Within a distributed computing environment, multiple computer systems may be connected to a communications network and individual program modules of the invention may be distributed amongst the computer systems.

With specific reference to FIG. 1, a general purpose computer system 1 which is generally known in the art comprises a desk-top chassis base unit 100 within which is contained the computer power unit, mother board, hard disk drive or drives, system memory, graphics and sound cards, as well as various input and output interfaces. Furthermore, the chassis also provides a housing for an optical disk drive 110 which is capable of reading from and/or writing to a removable optical disk such as a CD, CDR, CDRW, DVD, or the like. Furthermore, the chassis unit 100 also houses a magnetic floppy disk drive 112 capable of accepting and reading from and/or writing to magnetic floppy disks. The base chassis unit 100 also has provided on the back thereof numerous input and output ports for peripherals such as a monitor 102 used to provide a visual display to the user, a printer 108 which may be used to provide paper copies of computer output, and speakers 114 for producing an audio output. A user may input data and commands to the computer system via a keyboard 104, or a pointing device such as the mouse 106.

It will be appreciated that FIG. 1 illustrates an exemplary computer system only, and that other configurations of computer systems are possible which can be used with the present invention. In particular, the base chassis unit 100 may be in a tower configuration, or alternatively the computer system 1 may be portable in that it is embodied in a lap-top or notebook configuration. Other configurations such as personal digital assistants or even mobile phones may also be possible.

Figure 2:
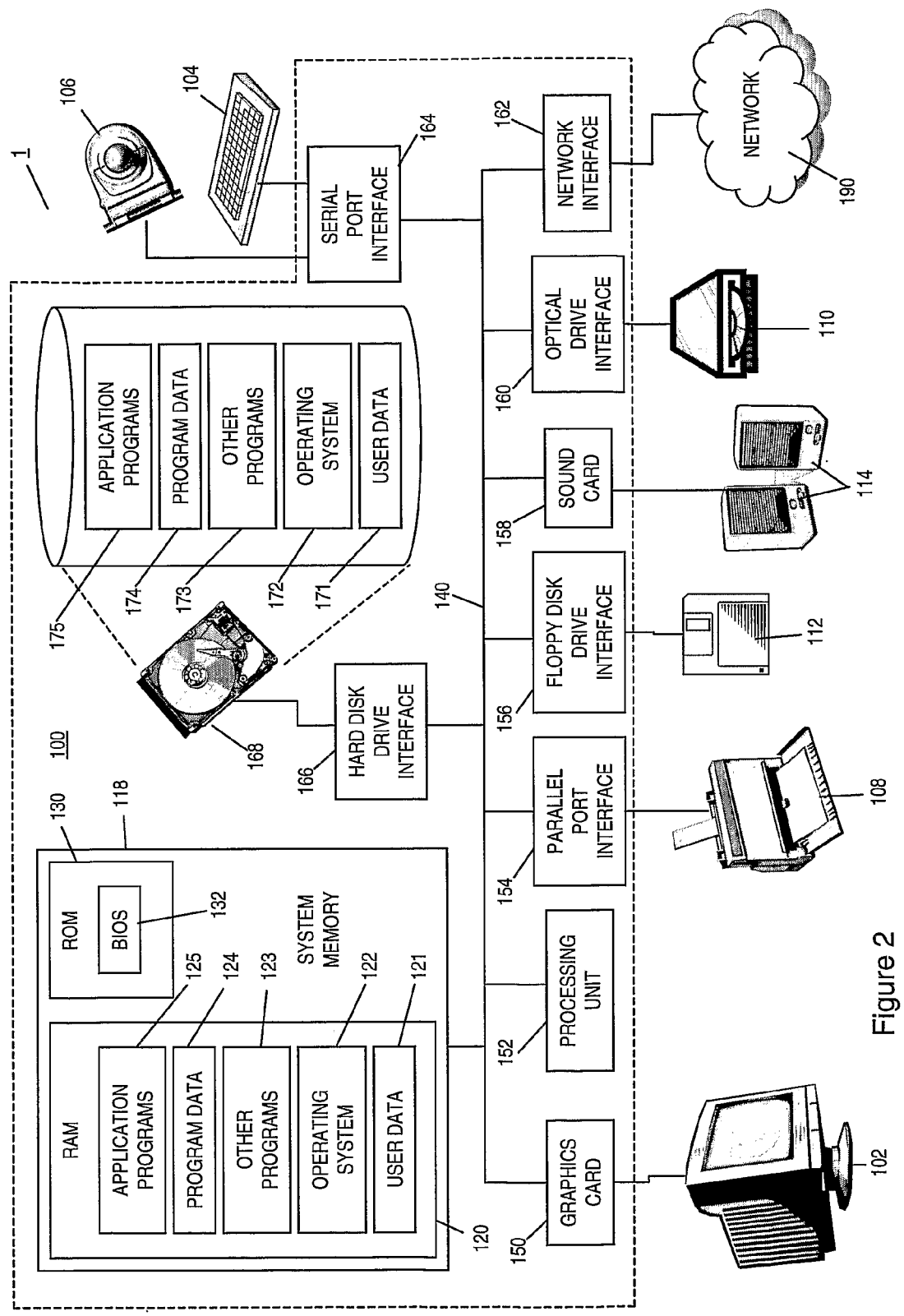
FIG. 2 is a block diagram of components of the general purpose computer system of FIG. 1.
Figure 3:
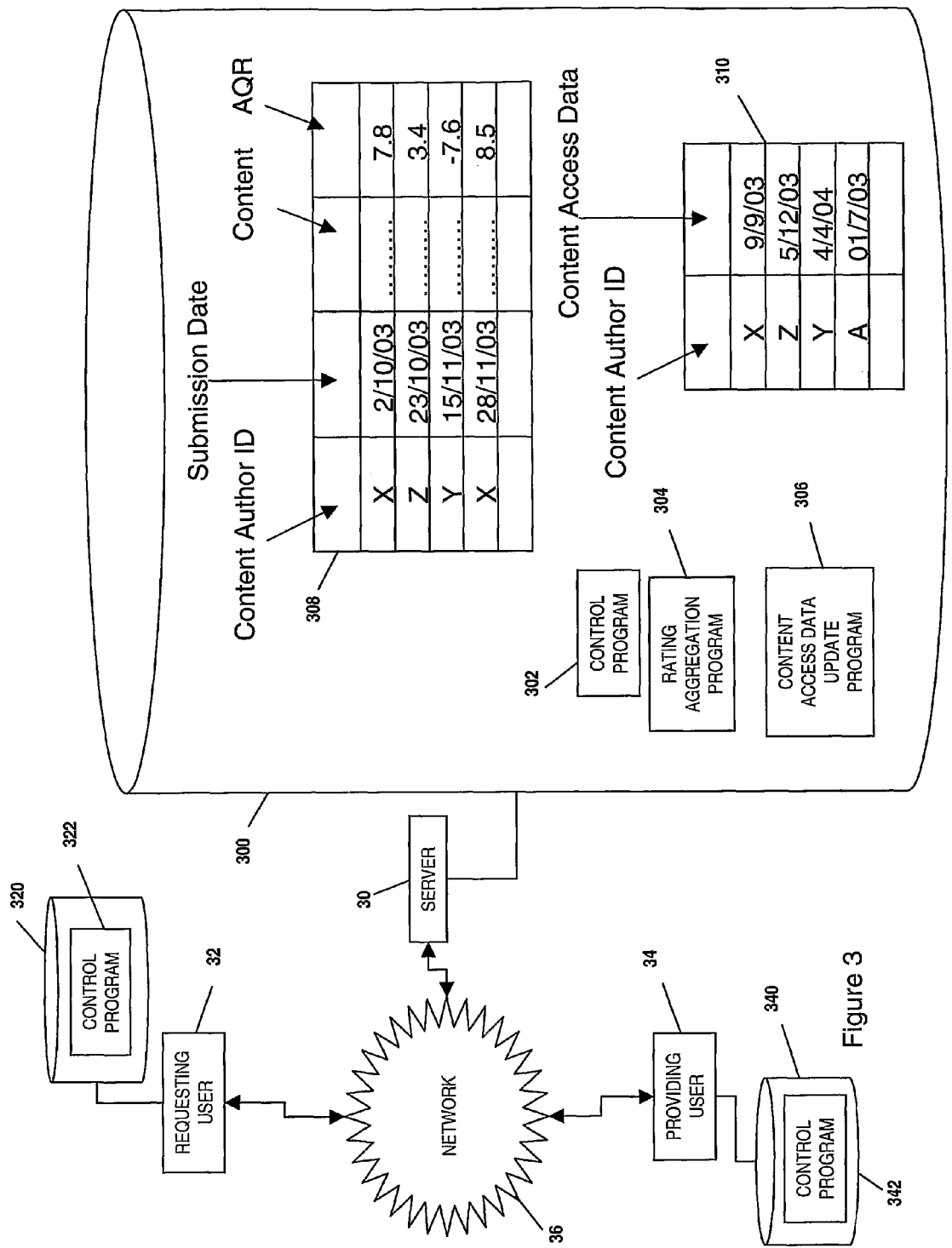
FIG. 3 is a system block diagram illustrating a first embodiment of the present invention.

FIG. 2 illustrates a system block diagram of the system components of the computer system 1. Those system components located within the dotted lines are those which would normally be found within the chassis unit 100.

With reference to FIG. 2, the internal components of the computer system 1 include a mother board upon which is mounted system memory 118 which itself comprises random access memory 120, and read only memory 130. In addition, a system bus 140 is provided which couples various system components including the system memory 118 with a processing unit 152. Also coupled to the system bus 140 are a graphics card 150 for providing a video output to the monitor 102; a parallel port interface 154 which provides an input and output interface to the system and in this embodiment provides a control output to the printer 108; and a floppy disk drive interface 156 which controls the floppy disk drive 112 so as to read data from any floppy disk inserted therein, or to write data thereto. In addition, also coupled to the system bus 140 are a sound card 158 which provides an audio output signal to the speakers 114; an optical drive interface 160 which controls the optical disk drive 110 so as to read data from and write data to a removable optical disk inserted therein; and a serial port interface 164, which, similar to the parallel port interface 154, provides an input and output interface to and from the system. In this case, the serial port interface provides an input port for the keyboard 104, and the pointing device 106, which may be a track ball, mouse, or the like.

Additionally coupled to the system bus 140 is a network interface 162 in the form of a network card or the like arranged to allow the computer system 1 to communicate with other computer systems over a network 190. The network 190, may be a local area network, wide area network, local wireless network, or the like. In particular, IEEE 802.11 wireless LAN networks may be of particular use to allow for mobility of the computer system. The network interface 162 allows the computer system 1 to form logical connections over the network 190 with other computer systems such as servers, routers, or peer-level computers, for the exchange of programs or data.

In addition, there is also provided a hard disk drive interface 166 which is coupled to the system bus 140, and which controls the reading from and writing to of data or programs from or to a hard disk drive 168. All of the hard disk drive 168, optical disks used with the optical drive 110, or floppy disks used with the floppy disk 112 provide non-volatile storage of computer readable instructions, data structures, program modules, and other data for the computer system 1. Although these three specific types of computer readable storage media have been described here, it will be understood by the intended reader that other types of computer readable media which can store data may be used, and in particular magnetic cassettes, flash memory cards, tape storage drives, digital versatile disks, or the like.

Each of the computer readable storage media such as the hard disk drive 168, or any floppy disks or optical disks, may store a variety of programs, program modules, or data. In particular, the hard disk drive 168 in the embodiment particularly stores a number of application programs 175, application program data 174, other programs required by the computer system 1 or the user 173, a computer system operating system 172 such as Microsoft® Windows®, Linux™, Unix™, or the like, as well as user data in the form of files, data structures, or other data 171. The hard disk drive 168 provides non volatile storage of the aforementioned programs and data such that the programs and data can be permanently stored without power.

In order for the computer system 1 to make use of the application programs or data stored on the hard disk drive 168, or other computer readable storage media, the system memory 118 provides the random access memory 120, which provides memory storage for the application programs, program data, other programs, operating systems, and user data, when required by the computer system 1. When these programs and data are loaded in the random access memory 120, a specific portion of the memory 125 will hold the application programs, another portion 124 may hold the program data, a third portion 123 the other programs, a fourth portion 122 the operating system, and a fifth portion 121 may hold the user data. It will be understood by the intended reader that the various programs and data may be moved in and out of the random access memory 120 by the computer system as required. More particularly, where a program or data is not being used by the computer system, then it is likely that it will not be stored in the random access memory 120, but instead will be returned to non-volatile storage on the hard disk 168.

The system memory 118 also provides read only memory 130, which provides memory storage for the basic input and output system (BIOS) containing the basic information and commands to transfer information between the system elements within the computer system 1. The BIOS is essential at system start-up, in order to provide basic information as to how the various system elements communicate with each other and allow for the system to boot-up.

Whilst FIG. 2 illustrates one computer system which may be used in embodiments of the invention, it will be understood by the skilled man that other peripheral devices may be attached to the computer system, such as, for example, microphones, joysticks, game pads, scanners, or the like. In addition, with respect to the network interface 162, we have previously described how this is preferably a wireless LAN network card, although equally it should also be understood that the computer system 1 may be provided with a modem attached to either of the serial port interface 164 or the parallel port interface 154, and which is arranged to form logical connections from the computer system 1 to other computers via the public switched telephone network (PSTN).

Where the computer system 1 is used in a network environment, it should further be understood that the application programs, other programs, and other data which may be stored locally in the computer system may also be stored, either alternatively or additionally, on remote computers, and accessed by the computer system 1 by logical connections formed over the network 190.

A first embodiment of the present invention which is based upon a classical centralised client-server architecture will now be described with respect to FIGS. 3 to 6. More particularly, with reference to FIG. 3, here a server computer 30 is provided which is arranged to communicate via a network 36 with a requesting user client computer 32, and a providing user client computer 34. Each of the server computer 30, requesting user client computer 32, and providing user client computer 34, may be general purpose computer systems as described above, provided with appropriate software. In particular, the requesting user client computer 32 is provided with a computer readable storage medium 320, such as a hard disk drive, optical disk drive, dvd drive, solid state storage, or the like, upon which is stored a control program 322, which is arranged to control the requesting user client computer 32 to perform in accordance with the embodiment of the invention. Similarly, the providing user client computer 34 is provided with a computer readable storage medium 340, such as a hard disk drive, optical disk drive, dvd drive, solid state storage, or the like, upon which is stored a control program 342, which controls the providing user client computer 34 to operate in accordance with the embodiment of the invention, in the manner to be described.

Additionally, the server computer 30 is provided with a computer readable storage medium 300, such as a hard disk drive, optical disk drive, dvd drive, solid state storage, or the like, upon which is stored a control program 302, a rating aggregation program 304, and a content access data update program 306. The control program 302 generally controls the server computer 30 to operate in accordance with the embodiment of the invention, such as by permitting the server to communicate appropriately with the requesting user client computer 32, and the providing user client computer 34. The rating aggregation program 304 and the content access data update program 306 are specific sub-component programs required by the server computer 30 to operate on the data stored therein during the operation of the embodiment of the invention, which operations will be described later.

Additionally stored on the computer readable storage medium 300 of the server computer 30 is a content item store data 308. The content data comprises sets of content items, such as text, audio data, visual data, or the like, which the server is able to provide to client computers in response to requests received therefrom. Each content item is stored together with the identification of the client computer who provided the content item, the date at which the content item was submitted to the server computer 30 for storage and subsequent provision to other users (the "submission date"), and an aggregate quality rating (AQR) which indicates the rating given to the content item by other users who have had it provided thereto. For example, AQRs may be a numerical value within specified range, such as −10 to +10.

In addition to the content item store data 308, the computer readable storage medium 300 of the server computer 30 also stores a set 310 of content access data, for each client computer registered with the server. Therefore, each set of content access data is indexed by the client computer ID ("content author ID" in the diagram) to which it relates.

The content access data is very important to the operation of the embodiments of the present invention. This is because it defines how much of the content stored in the content item store 308 will be returned to a requesting user client computer 32 in response to a request for content. Moreover, within embodiments of the invention to be described the values of the content access data are dependent upon the content which any particular registered client user has submitted to the server 30 for storage and provision to other users, and hence may be changed in dependence on the registered client computers providing content for provision. Moreover, the content access data may take many forms. Within the diagram, and in the preferred embodiment, the content access data may take the form of a date and/or time stamp, specifying a date and/or time which acts as a cut-off point for content to be served to a requesting user by the server. That is, the date and/or time stamp stored as the content access data for any particular registered user specifies the latest date of content which may be served to the requesting user in response to a request.

Alternatively, in other embodiments, the content access data may take the form of a geographical position, and a distance value for each user. More specifically, in such an embodiment the geographical location of each registered client user is stored with the content access data together with a distance threshold. Within the content item store 308, for each content item as well as storing the submission date of that content item, the geographical position of the providing user who provided the content is also stored. Then, the content access data in the form of the distance threshold can be used to specify which content items may be provided to a requesting user in response to a request therefore, based upon the distances between the providing users, and the requesting user.

In a further embodiment, the content access data may simply comprise a percentage value, fraction, or the like, specifying the percentage of the available content items stored in the contents item store 308 which may be returned to a requesting user in response to a request therefrom. Thus, for example, if the content access data for client X was 60%, then only 60% of the available content items would be returned to that client X upon request.

Furthermore, in further embodiments the property values and content access data may be quality values indicating a quality value given to particular content, for example based upon previous user reviews. This then allows the content access values to act as so-called "quality horizons" defining the scope of content which may be accessible by a user based upon the quality rating given to each piece of content.

Moreover, in yet further embodiments the property values and content access data may be reputation values indicating a reputation value given to particular content based upon a reputation of the user who provided the content. For example, the reputation information may be derivable from previous user reviews of content provided by that same user. This then allows the content access values to act as so-called "reputation horizons" defining the scope of content which may be accessible by a user based upon the reputation rating given to the user who supplied each piece of content.

The content access data may of course take other forms, provided that it is usable to determine a subset of the available content items to be returned to a requesting user.

Having described the basic elements of the first embodiment of the invention, the operation of those elements in performance of the embodiment will now be described with respect to FIGS. 4, 5, and 6.

The basic premise behind the first embodiment of the invention is to provide a client server based centralised content provision system which stores content items centrally, together with content access data for each registered client user. The content access data for each registered client user may be changed when that user provides additional content items to the server for storage, and for subsequent provision to other users. Additionally, when a user requests content items from the server computer 30, then that user's content access data is used to determine the contents of a subset of the available content items which match the search request, and that subset is then provided to the requesting user as the search results. The rationale behind this operation is that in order to obtain a greater amount of content in response to a request, any particular client user will have to make content contributions him or herself, such that his content access data defining the amount of content which is served may then be changed. It is thought that such operation should incentivise client users to provide content to the server computer 30, which content may then be provided to other users.

Figure 6:
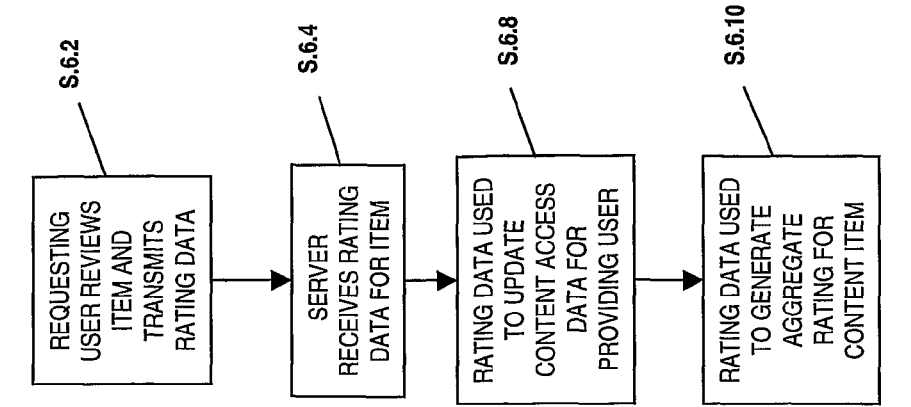
FIG. 6 is a flow diagram illustrating part of the operation of the first embodiment of the present invention.
Figure 5:
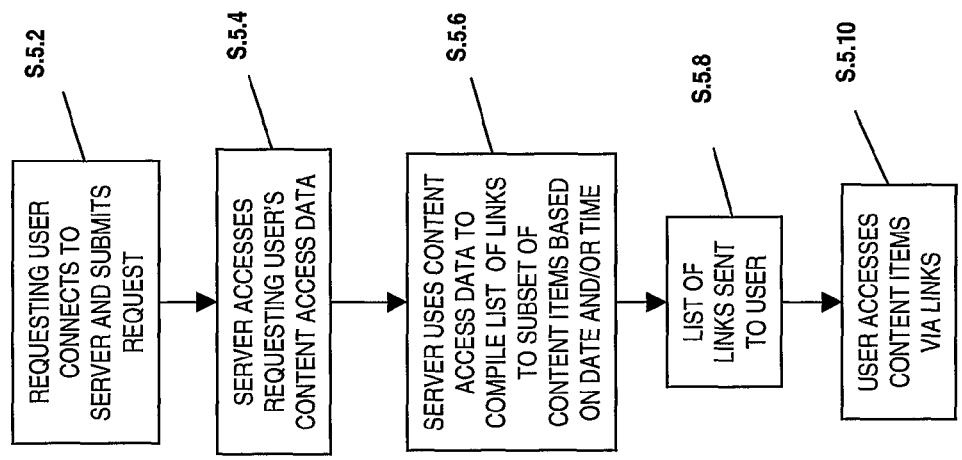
FIG. 5 is a flow diagram illustrating part of the operation of the first embodiment of the present invention.
Figure 4:
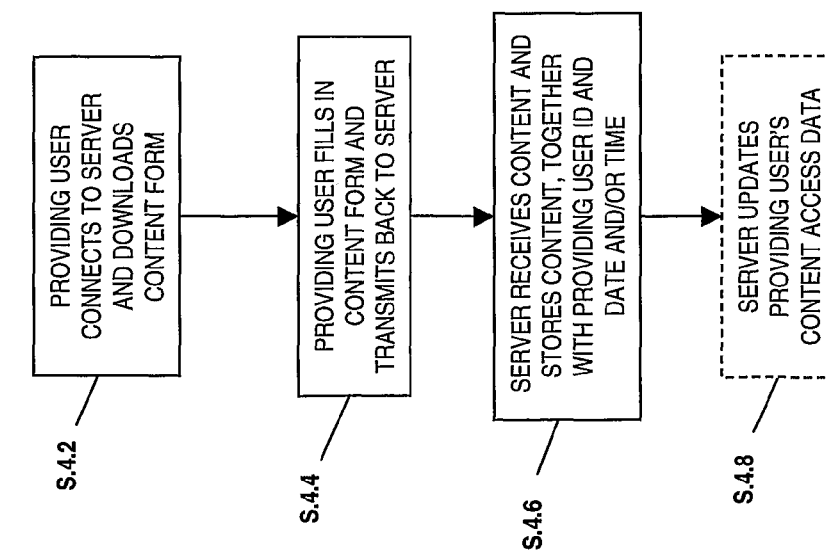
FIG. 4 is a flow diagram illustrating part of the operation of the first embodiment of the present invention.

In view of the above described overview, FIGS. 4, 5, and 6, illustrate respective different operations which may be performed by the first embodiment of the invention. In particular, FIG. 4 illustrates those steps which are performed when a client computer provides content to the server computer 30 for storage, FIG. 5 illustrates those steps which are performed when a client computer requests content from the server computer 30, and FIG. 6 illustrates one particular way in which the content access data for a client computer may be updated, in dependence on the ratings of content provided by that user, given by other users.

With reference to FIG. 4, therefore, the steps involved in a user providing content to the server computer will now be described.

Firstly, at step 4.2 the providing user computer 34 connects to the server computer 30, and downloads a content provision form therefrom. This content provision form may be in the form of a web page, or the like, which allows the user to enter or store content therein, which may then be transmitted back to the server. Next, at step 4.4, the user of the providing user client computer 34 fills in the content form, and controls the providing user client computer 34 to transmit the form back to the server computer 30. At step 4.6, the server computer 30 receives the content, and stores the content in the content set 308, together with the providing user client user computer ID, and date and/or time of the content submission. Optionally, depending on the form of the content access data, the location of the providing user client computer may also be stored together with the content.

At this point, therefore, the providing user client computer 34 has communicated new content to the server computer 30, which has stored the new content in its content store 308. In some variants of the first embodiment of the invention, processing of the content provision would now end, without the providing user's content access data being changed in response to the provision of the content. In such variants, change of the content access data may be dependent upon review ratings received from other users relating to the provided content item. In other variants, however, the content access data for the providing user 34 may be instantly changed to reflect the fact that the providing user has provided a new content item. Where this is the case, at step 4.8 the server computer 30 updates the providing user 34's content access data, in the content access data store 310.

The manner in which the content access data for the providing user is changed will depend upon the format of that content access data. Moreover, however, even within any particular format there may be several different mechanisms by which the content access data may be updated. For example, where the content access data is a percentage, or fraction, then that percentage or fraction may be increased, such that the providing user may access more of the available content in subsequent requests than had previously been the case. The amount of the increase may be fixed, or variable, and may be dependent upon factors such as the size of the content item provided.

Where the content access data is based on a distance threshold, then that threshold may also be increased to reward the user for the provision of the new content item. Again, that increase may be fixed, or variable, and dependent upon factors such as the size of the content item. Similarly, where the content access data is time or date based, then the time and/or date stamp which forms the content access data may be brought forward by a certain amount, that amount being fixed or variable. Where the amount is variable then the increase may be dependent upon some of the factors outlined above, i.e. size of the content item, for example. Alternatively, the time stamp could be brought immediately forward to match the submission date of the content item, such that by providing a content item, the providing user's content access data is immediately brought up to date. Further mechanisms by which the content access data may be changed will be described later.

Turning now to FIG. 5, this illustrates the steps involved in the first embodiment for the server computer to provide content to a requesting user client computer. Here, at step 5.2 a requesting user client computer 32 connects to the server computer 30 via the network 36, and submits its request for content. The request may take the form of a search request for specific subject matter, as is well known in the art.

Next, at step 5.4, the server accesses the requesting user client computer's content access data in the content access data store 310, to determine the amount of access to content to which the requesting user client computer 32 is entitled. At the same time, the server computer 30 may search through the available content items stored in the content item store 308, to determine those content items which match the search request based on subject matter, keywords, rating or the like. Following this, at step 5.6 the server computer 30 uses the content access data accessed at step 5.4 to compile a list of links to a subset of the content items which match the requesting user's search request. Thus, for example, where the content access data is a time and/or date stamp, at step 5.6 the server reviews the submission dates of those content items which were found to match the search request, and places links (such as URLs) to those content items whose submission date was prior to the time and/or date stamp stored in the requesting users content access data, in the subset. Then, at step 5.8 the subset of links is sent to the user 32 via the network 36. At step 5.10, the requesting user client computer 32 receives the sub-setted list of links, and can access the listed content items from the server computer via the links. The links may be URLs, or the like, which instruct the server computer 30 to access the particular linked-to content item within the content store 308, and provide it to the user.

Thus, in accordance with the operation of FIG. 5, the content access data is used to determine a subset of matching content items to a search request, and that subset is then made available to the user. In order to gain access to additional content items not within the subset, a requesting user must provide a content item to the server him or herself, such that his content access data may then be updated, thus permitting him increased access to other content items. By restricting the requesting user to a subset of the available content items, it is thought that the provision of additional content items from the requesting user will be encouraged.

Turning now to FIG. 6, this illustrates a further mechanism by which content access data may be changed to allow a client user more access to content. Note that this mechanism may be used in addition or as an alternative to the content access update step of step 4.8, described earlier.

More particularly, the process of FIG. 6 is based upon the premise that a client user's content access data may be updated in dependence upon review ratings given by other client users to the content items which he has provided. Where good reviews are received, then the content access data may be updated to a greater extent than would otherwise be the case, but where bad reviews are received, then the content access data may be updated to a lesser extent, not at all, or perhaps even decremented.

Specifically, with reference to FIG. 6, at step 6.2 a user who has requested content items and been served with those items may review the item, and follow a link provided with the item to a ratings page provided by the server computer 30, which allows the requesting user to specify a rating for that item. This rating data is then transmitted back to the server computer 30, and received at step 6.4. Next, at step 6.8, the server computer 30 uses the received rating data to update the content access data for the providing user who provided the content item in the first place (the content item having been provided, for example, by the process of FIG. 4). As a non limiting example of the rating data, and how this may be used to update the content access data for the providing user, in a particular variant of the first embodiment the rating data may be a number from −10 to +10. Negative numbers are intended in this context to mean that the accessed quality of the content item is poor. Positive numbers are intended to mean that the content has been assessed to provided useful information (of varying value) and so to add to the overall utility of the content provision system.

When the rating data is in this form, the server computer 30 checks whether the requesting user who has provided the rating has reviewed that content item before (a list of requesting users may be kept for each content item, for this purpose) and the rating value is added to the content access data value to update the content access data. Thus, where the content access data is a date and/or time stamp, then that stamp may be brought forward by an amount indicated by the review (e.g. in number of days). Alternatively, where the content access data is a distance threshold, or a percentage or fraction, then similarly those thresholds, or percentages, or fractions, may be increased by the rating value. To prevent a requesting user providing multiple reviews of a content item, and therefore artificially increasing the content access data of the providing user, following the incrementing of the content access data by the review, if the requesting user had previously provided a rating, then the content access data is then decremented by that previous rating. Thus, for example, where the content access data is a date stamp, if the previous rating had been seven, and the new rating is nine, the time stamp is brought forward nine days to account for the new rating, but then decremented by seven days to discount the previous rating. Such a mechanism prevents a requesting user from artificially increasing a providing user's content access data value.

Once the rating data has been used to update the content access data, then the next step, at step 6.10, is to use the same rating data to update or generate an aggregate quality rating for that content item. It will be recalled from the above discussion of FIG. 3 that the content item store 308 stores for each content item an aggregate quality rating, which is preferably, although not exclusively, the output of an exponential smoothing function to various ratings values which are received from other users over time. An example exponential smoothing function which may be used for this purpose may be found at http://www.fourmilab.ch/hackdiet/www/subsubsection1_4_1_0_8_3.html. Once the AQR value for the content item has been updated, the process of FIG. 6 is finished.

The first embodiment of the invention therefore provides a client-server architecture based system which regulates access to content items based upon the provision of content items from client users themselves. The regulation of the access is performed by storing for each client user content access data, which is updated or changed in dependence on the provision of content items from the users themselves. The change in the content access data may be deterministic in that for any content item which is provided the content access data is updated by a fixed or variable amount, or may be non-deterministic, such as based upon ratings of the content item provided by other users.

A second embodiment of the present invention will now be described with respect to FIGS. 7 to 15. The second embodiment and the various variants thereof to be described are based upon a peer-to-peer architecture, with no central server as such. In this respect, each peer computer system, which may be a general purpose computer system such as that previously described, is provided with software which preferably allows it to perform each of the actions required in taking certain roles within the second embodiment of the invention. During each interaction each peer computer then adopts one or more of the available roles.

More specifically, within the second embodiment during each interaction a peer computer system adopts one or more of the following roles:
1. Content authors 72, being peers who have content items that they intend to submit for provision to other users;
2. Account holders, being peers who, acting independently, are responsible for tracking the level of contribution of content items of other peers;
3. Content holders, being those peers who store the content items submitted by content authors; and
4. Requesters 74, being those peers who in an individual interaction, wish to access content items.

Note that preferably each peer adopts each role in different transactions. That is, each peer may act as the content holder for content provided by other peers, and similarly each peer may be an account holder for some others of its peers (preferably more than one to improve resilience and security). Moreover, each peer acting as a content author provides content items to be held by content holders (again preferably more than one to improve resilience and security).

Individual peer computer systems are uniquely identified by peer identifiers, and the content items provided thereby are also uniquely identified by content identifiers. Peer identifiers are preferably based on cryptographic certificates, and so are un-forgeable and can be used to sign messages and content. In order to allow the second embodiment of the invention to operate, the peer to peer system as a whole operates two distributed algorithms, the operation of which is already known in the art and described in, for example, Castro et al "*Secure Routing For Structured Peer to Peer Overlay Networks*" ACMSIGOPS operating systems review, Vol 36, issue SI Winter 2002 special issue: Peer-to-Peer infrastructure, pp 299-314, 2002. These two algorithms are:
1. A distributed search mechanism (DSM) that, provided with attributes of a search, is able to identify a set of content items that may meet those search attributes; and
2. A distributed hash table (DHT) that can be used to
   a) take a peer identifier and return an IP address at which that peer can be contacted;

b) take a peer identifier and return a set of IP addresses being the peers responsible for storing the account for the identified peer; and c) take a content identifier and return a set of IP addresses being the peers responsible for storing the content item itself.

We assume that the distributed hash table can not be subverted by content authors so that they can intercept all messages to their own account holders and maliciously rewrite them. This can be achieved by using secure versions of the distributed hash table, such is that known in the art as Secure Pastry, and described in ibid.

Figure 7:
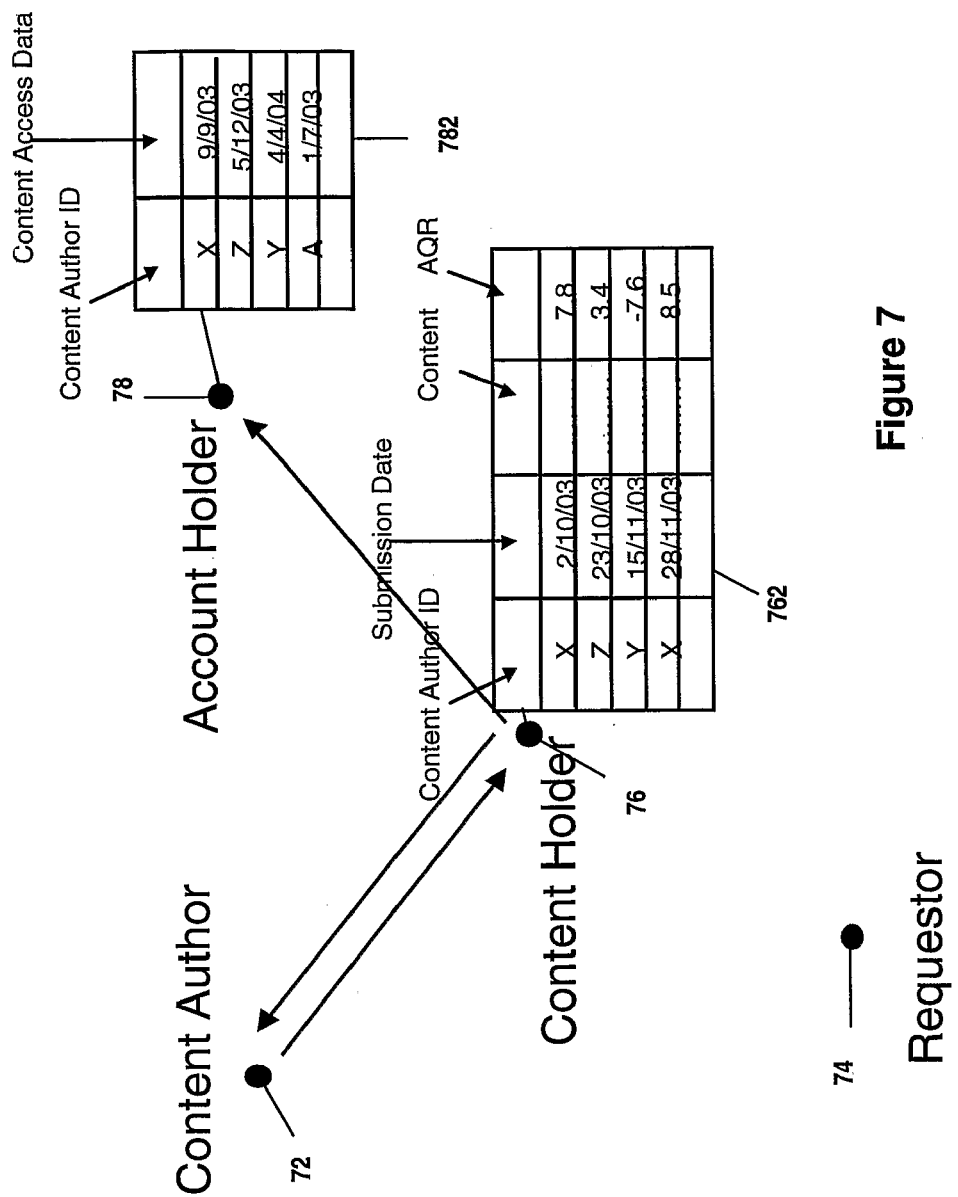
FIG. 7 is a diagram illustrating elements and message flows of a second embodiment of the present invention.

In view of the above, and referring to FIG. 7, the content holders are each provided with a content item store 762, which is similar to the content item store 308 described in respect of the first embodiment, and which has identical attributes thereto. Additionally, the account holder peers 78 are provided with respective content access data store 782s, which again are similar to the content access data store 310 of the first embodiment, and which may have similar attributes thereto. In particular, the content access data stores 782 may store content access data in any of the formats described previously in respect of the first embodiment i.e. a time and/or date stamp, a percentage or fraction, or a geographical position and a distance threshold.

Given the above described peer to peer infrastructure, in common with the first embodiment the second embodiment provides a content provision method and system which regulates the content which is provided to a requesting peer based upon content access data which is stored for that peer, the content access data being used to generate a subset of available content items in response to a request therefor. The differences between the second embodiment and the first embodiment is that the second embodiment is based upon peer-to-peer technology and hence the message flows between peers are more complicated than in the case of the client-server architecture. The processes performed by the peers within the second embodiment of the present invention will now be described More particularly, with reference to FIGS. 7 and 8 those processes performed by the peers within the system when a peer submits new content for storage by the system will now be described.

Firstly, at step 8.2 a providing peer in the form of a content author 72 generates a new content item, and cryptographically signs that content with his digital signature. Next, at step 8.4 the content author 72 uses the distributed hash table to identify the relevant content holder 76 for that content, and sends the cryptographically signed new content to the content holder.

At step 8.6 the content holder receives the cryptographically signed content, and stores the content in its content store 762 together with the peer ID of the content author and a date and/or time stamp of when the content item was received. Optionally, depending on the variant of the second embodiment which is being used, the content holder 76 may also store location data relating to the location of the content author 72, if the content access data is geographically based.

In some variants of the invention, and in particular those where peer ratings of content items are used to update the content access data of content authors, the process of FIG. 8 will end at that point. In other variants, however, where content access data is updated simply by a content author providing a new content item, then processing proceeds to step 8.8, and beyond.

Here, at step 8.8 the content holder 76 sends a cryptographically signed receipt to the content author 72. Similarly, at step 8.10 the content holder 76 also sends a cryptographically signed receipt for the content to the content author 72's account holder 78. At step 8.12 the account holder 78 verifies the received receipt using the content holder 76's public signature, and thereafter updates the content access data for the content author 72 using the information concerning the content item contained within the received receipt. The precise mechanism by which the content access data is updated by the account holder 78 will depend upon the format of the content access data, and in this respect any of the mechanisms mentioned previously in respect of step 4.8 of the first embodiment may equally be used here.

Figure 10:
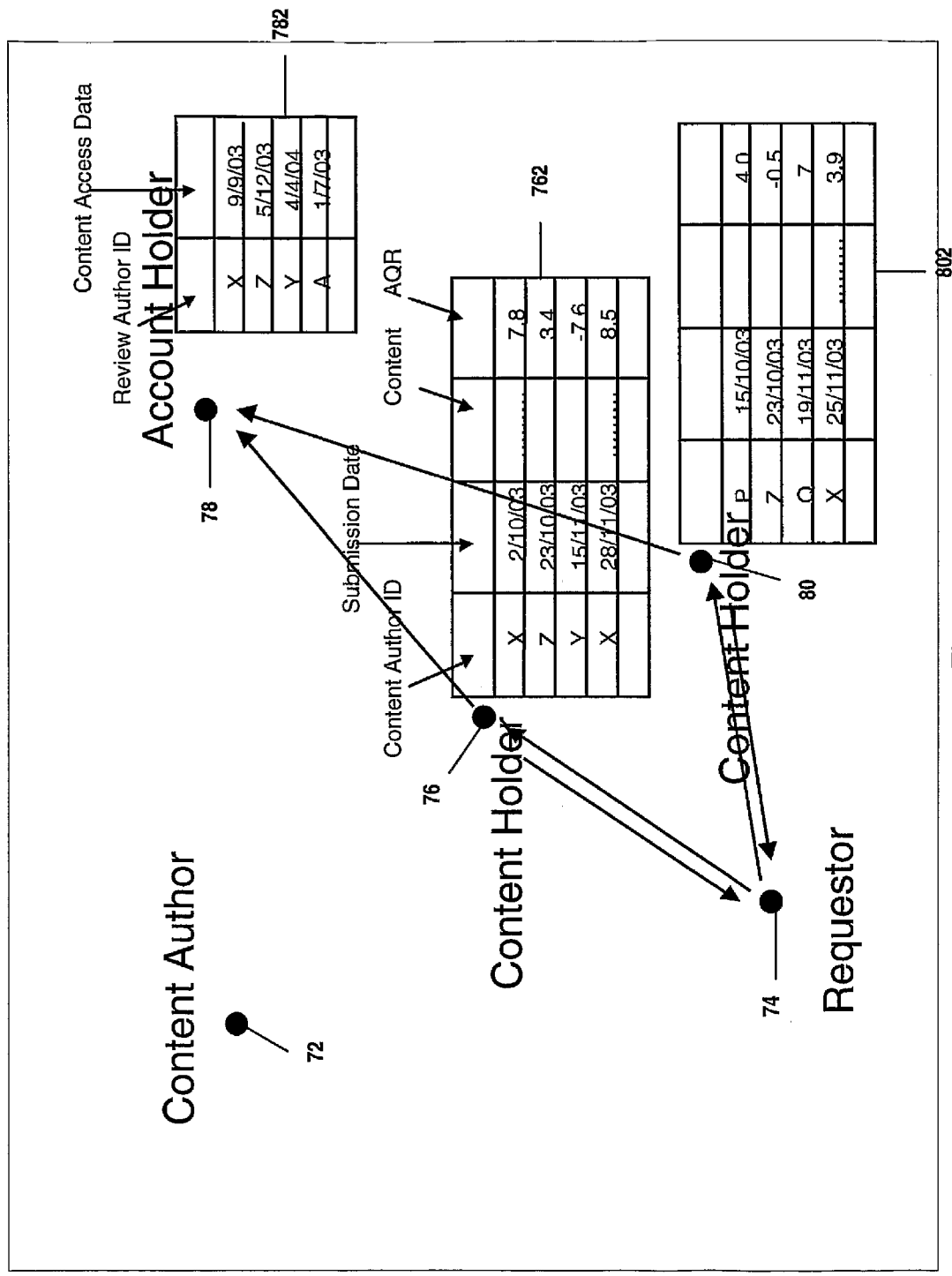
FIG. 10 is a diagram illustrating message flows between elements within the second embodiment of the present invention.
Figure 11:
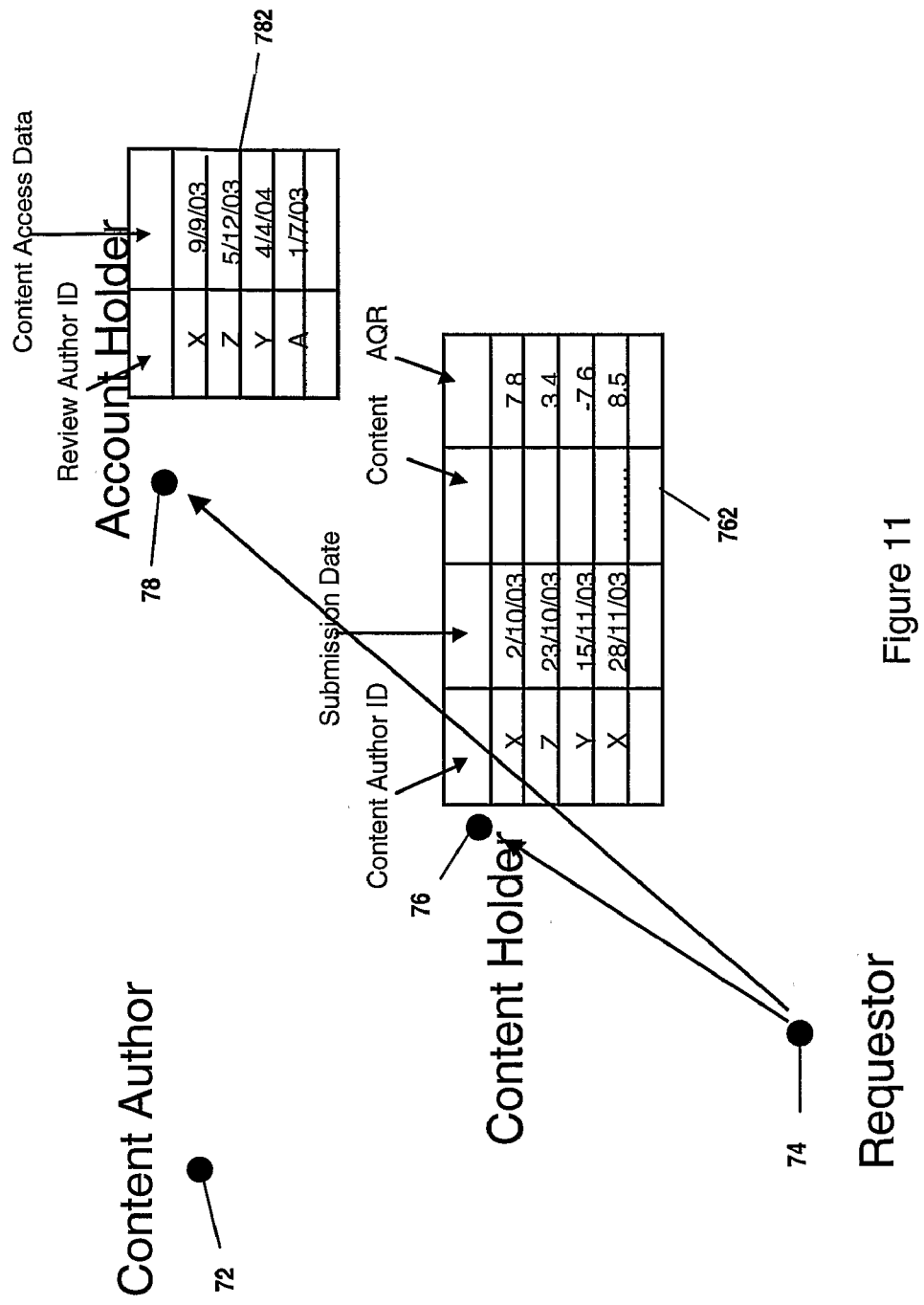
FIG. 11 is a diagram illustrating message flows between elements within a second embodiment of the present invention.

The operation of the second embodiment in servicing requests for content from requesting peers 74 will now be described with respect to FIGS. 9 and 10.

Firstly, at step 9.2 a requesting peer 74 uses the distributed search mechanism provided by the distributed hash table to identify potential content items which meet his search attributes. Then, at step 9.4 the requesting user uses the distributed hash table to identify those content holders 76 and 80 which are storing the identified content items which potentially meet the requesting user's search criteria, and access queries are then sent to the identified content holders 76 and 80, asking those content holders to provide access to the stored content items, either by providing copies of the content items themselves, or links thereto.

Following the receipt of the access queries, at step 9.6 the content holders 76 and 80 use the distributed hash table to identify the account holder 78 for the requesting user 74, such that the content holders may then query the identified account holder for the requesting user 74's content access data, at step 9.8. The account holder 78 then responds to the patent holders' query with the content access data for the requesting user 74, and at step 9.10 the content holder 76 and 80 use the content access data to determine a subset of the identified content items to be returned to the requesting user. The precise mechanism used in this subset determination step will depend upon the format of the content access data, but generally the same steps as were performed by the server computer 30 at step 5.6 of the first embodiment may be performed by each content holder 76 and 80 on its own stored content items to produce respective subsets thereof. Next, at step 9.12 the content holders return their respective subsets of content items (or links thereto) to the requesting user 74.

Thus, within the second embodiment, as in the first embodiment, the content access data of the requesting user is used to limit the content items which are returned to the requesting user in response to a request received therefrom. However, as the content access data may be updated by the requesting user providing content items for provision to other users, it is believed that such operation will encourage the submission of content items by the requesting user 74 in the future.

In most variants of the second embodiment, the processing of FIG. 9 would end at that point, but in some variants of the second embodiment it is possible that the content access data for the content authors who provided the content which has been served by the process of FIG. 9 is updated to reflect the fact that those content items have been accessed by another user. To achieve such operation, the optional steps 9.14 and 9.16 may be performed. More particularly, at step 9.14, the content holders which have provided the subset of content items to the requesting users send cryptographically signed receipts for each provided content item to each content author's account holder.

This involves, for each content item (or link thereto) which has been provided by each content holder in a subset, locating, via the distributed hash table, the account holder for the content author of that content item, and sending the cryptographically signed receipt indicating the provision of that content item to another user to the content author's account holder. At step 9.16, upon receipt of such a cryptographically signed receipt, the account holder for the content author updates the content access data for that content author. The updating of the content data at step 9.16 may be performed in any of the manners described in respect of step 4.8 in the first embodiment, depending upon the format of the content access data.

Thus far, with respect to the second embodiment we have described how new content items may be submitted, and how requests for content may be serviced by peers. A further mechanism by which content authors' content access data may be changed will now be described with respect to FIGS. 11 and 12, based upon a ratings mechanism, of ratings of content items by requesting peers.

Figure 12:
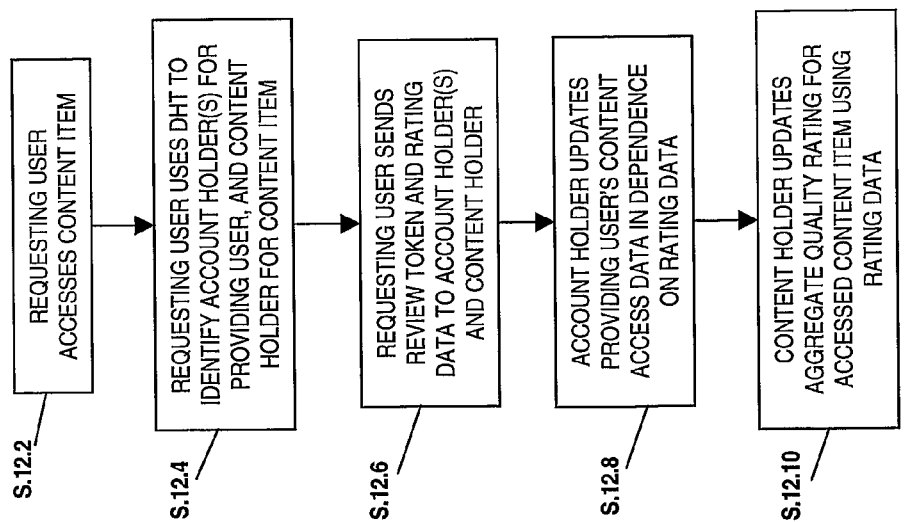
FIG. 12 is a flow diagram illustrating part of the operation of the second embodiment of the present invention.

FIG. 12 illustrates the process performed by this additional mechanism. In particular, following a request for content items such as that shown in FIG. 9, a requesting user 74 accesses a particular content item. Here, in addition to being provided with the content item (or a link thereto), by the content holder 76, the requesting user is also provided with a rating token, being a unique token signed by the content holder, and including the content identifier, and the content author identifier with a unique nonce.

In order to review the accessed content item, at step 12.4 the requesting user 74 uses the distributed hash table to identify the account holder or holders for the content author of the accessed content item, and also the content holder of the content item. Then, at step 12.6 the requesting user 74 sends the review token which is received from the content holder with the content item together with the rating data to both the identified account holder (or holders), and content holder.

Next, at step 12.8 the account holder updates the content author's content access data in dependence on the received rating data. As mentioned previously, there are many mechanisms by which this may be achieved, depending upon the format of the rating data, but the same mechanism as described in respect of step 6.8 of the first embodiment may equally be used here to update the content access data. Following this update, or at the same time, at step 12.10 the content holder updates the aggregate quality rating (AQR) for the accessed content item using the rating data. The precise mechanism by which this may be achieved may be that as described in respect of step 6.10 of the first embodiment.

According to the second embodiment, therefore, a peer-to-peer architecture based content provision system is provided which uses content access data which may be changed in response to the provision of content items by peers to define the amount of content which is provided in response to a request. Additionally, the content access data defining the amount of content provided may also be changed in dependence upon ratings of the provided content by other peers.

Figure 13:
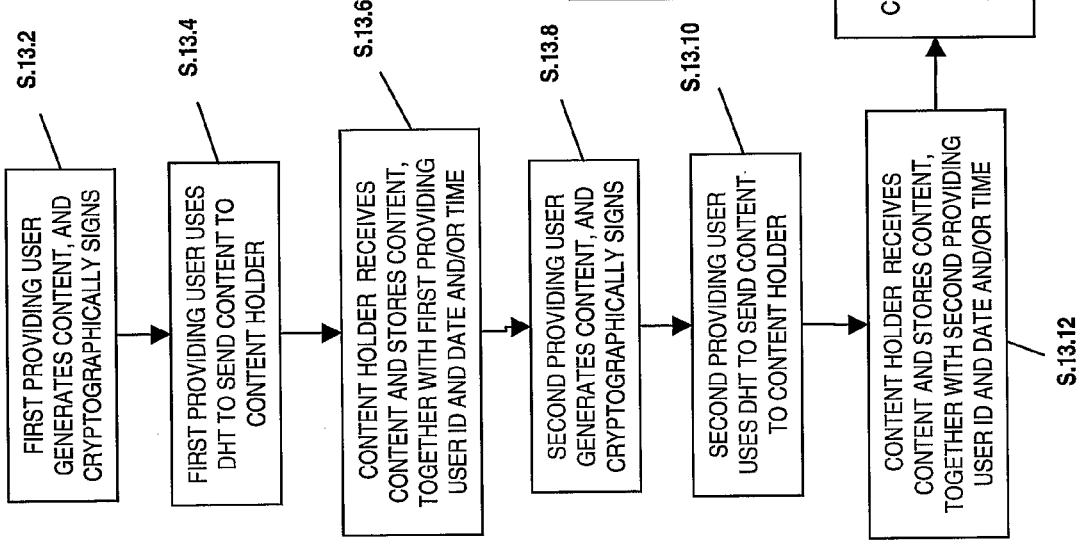
FIG. 13 is a flow diagram illustrating part of the operation of the second embodiment of the present invention.

A number of further variants of the second embodiment of the invention will now be described in respect of FIGS. 13, 14, and 15.

A first further variant will be described with respect to FIG. 13. This illustrates a mechanism by which the content access data for one of the peers may be updated in response to the time elapsed between that peer providing content with respect to the provision of earlier content by another peer. Such a mechanism may be particularly useful in newsgroup or bulletin board applications, wherein a first user posts a question or request to the newsgroup or bulletin board, and a second user then provides an answer to the question, or serves the request in a timely fashion. In particular, the speed of response in serving the request or answering the question can result in the serving peer's content access data being updated to a greater extent than would otherwise be the case.

In view of the above, at step 13.2 a first providing user may generate content, which he then cryptographically signs. At step 13.4 the first providing user uses the distributed hash table to send the content to an appropriate content holder, and at step 13.6 the appropriate content holder receives the content and stores the content, together with the peer ID of this first providing user, and the data and/or time of submission of that content. In the event of a news group application, for example, this content generated by the first providing user may be a question or a request, or the like.

Assume now that a second providing user wishes to answer the question or serve the request. To answer the question or serve the request, the second providing user generates content to answer the question or to serve the request, and cryptographically signs the content. Next, at step 13.10 the second providing user uses the distributed hash table to identify the content holder to which the content must be sent, and sends the content to that content holder. At step 13.12 the identified content holder receives the content and stores it, together with the peer ID of the second providing user, and the date and/or time at which the content was received. Therefore, in the context of the newsgroup application, the second providing user has answered the first providing user's question, or served his request, by providing the content to the content holder. The second providing user should therefore be rewarded for this timely service of the first providing user's request or question.

To achieve this reward, at step 13.14 the content holder sends a cryptographically signed receipt to the second providing user's account holder, the receipt indicating the date and/or time difference between the respective content provision by the first providing user, and the second providing user. That is, this is the time difference between the date and/or time of receipt of the content item from the first providing user, and the date and/or time of receipt of the content item from the second providing user.

Having received this receipt, at step 13.16 the account holder updates the content access data for the second providing user in dependence upon the date and/or time difference. How this update is achieved will depend upon the format of the content access data, but, for example, where the content access data is a time and/or date stamp itself, the stamp may be incremented by an amount equal to a fixed amount (10 days, say) minus the indicated time and/or date difference. Thus, the smaller the indicated difference, the greater the content access data is updated.

A further variant of the second embodiment will now be described with respect to FIG. 14.

Figure 14:
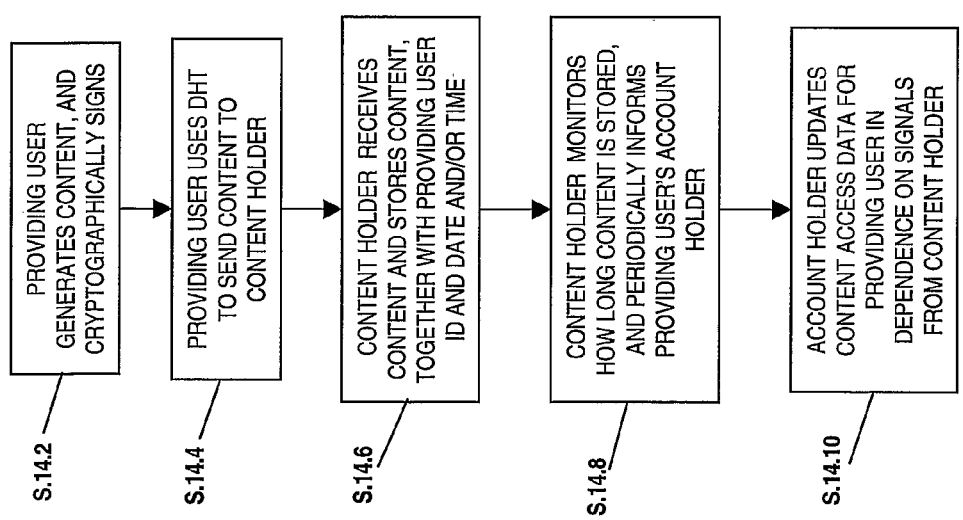
FIG. 14 is a flow diagram illustrating part of the operation of the second embodiment of the present invention.

In FIG. 14, the content access data of content authors is updated in dependence on the amount of time that a particular content item, has been stored by a content holder. Thus, at step 14.2 a content author generates content and cryptographically signs the content. Then, at step 14.4 the content author uses the distributed hash table to identify an appropriate content holder for the content, and sends the content to that content holder. At step 14.6 the content holder receives the content and stores the content, together with the peer ID of the content author, and the date and/or time at which the content item was received. Then, at step 14.8 the content holder monitors how long the content is stored, and periodically informs the content author's account holder that the content item is still being stored. In response to such a message from the content holder, at step 14.10 the account holder for the content author updates the content access data for the content author. The precise mechanism by which the content access data may be updated may be any of those mechanisms previously described, depending upon the content access data format.

A further variant of the second embodiment is described next with respect to FIG. 15. In this variant, the content access data is used not only to specify which content is returned in response to a request for content, but also specifies whether a particular requesting user is able to perform a content manipulation on content stored in a content holder. Particular content manipulations envisaged are those such as edit, delete, or the like.

Figure 15:
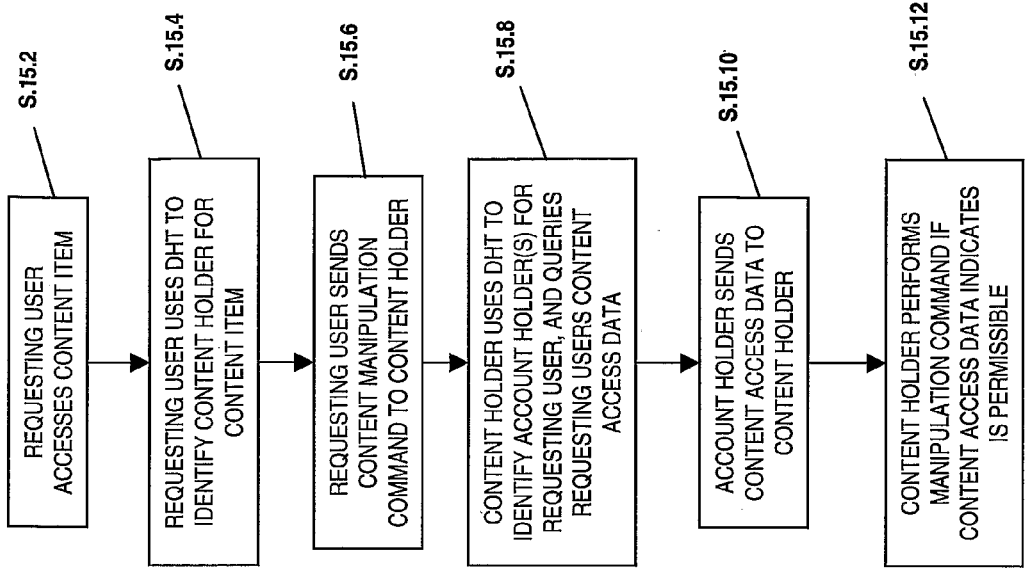
FIG. 15 is a flow diagram illustrating part of the operation of the second embodiment of the present invention.

In view of the above, and with reference to FIG. 15, within this variant of the second embodiment at step 15.2 a requesting user 74 accesses a content item using, for example, the process of FIG. 9. If the requesting user then wishes to manipulate that content item, such as to edit it, or delete it, then at step 15.4 the requesting user uses the distributed hash table to identify the content holder for the content item, and at step 15.6 sends a content manipulation command to the content holder specifying the manipulation to be performed.

However, since not every peer may be entitled on the basis of its content access data to validly manipulate content, in order to verify whether the requesting user is so entitled, the content holder uses the distributed hash table to identify the account holder or holders for the requesting user, and queries the requesting user's content access data, at step 15.8. In response to this query, at step 15.10 the account holder sends the content access data to the content holder, and at step 15.12 the content holder performs the manipulation command if the content access data indicates this is permissible. This indication will usually be whether or not the content access data meets a particular threshold value which indicates that a requesting user is able to manipulate the content.

Such a mechanism further rewards peers to provide content such that their content access data is updated to a level which is sufficient to allow them to manipulate content. This is further thought to encourage users to submit content for provision.

A further embodiment will now be described with respect to FIGS. 16 and 17. In this embodiment, instead of each peer having only one set of content access data which specifies the amount of access that that peer obtains for all content, irrespective of subject, in this further embodiment multiple sets of content access data are stored, for separate topics.

Figure 16:
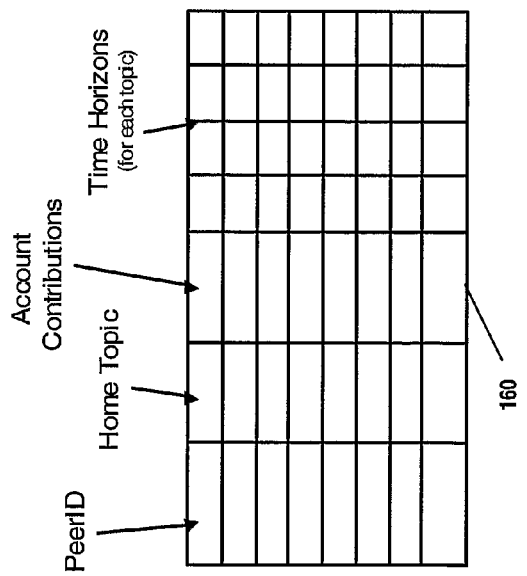
FIG. 16 is a diagram illustrating data which may be stored in a third embodiment of the present invention.

FIG. 16 illustrates a content store 160, in which content is stored arranged by the peer ID of the content author of the content. Additionally stored by peer ID, however, are various sets of content access data, one for each topic, as well as data indicating the "home topic" of the peer. The "home topic" is that topic to which the peer most contributes.

Figure 17:
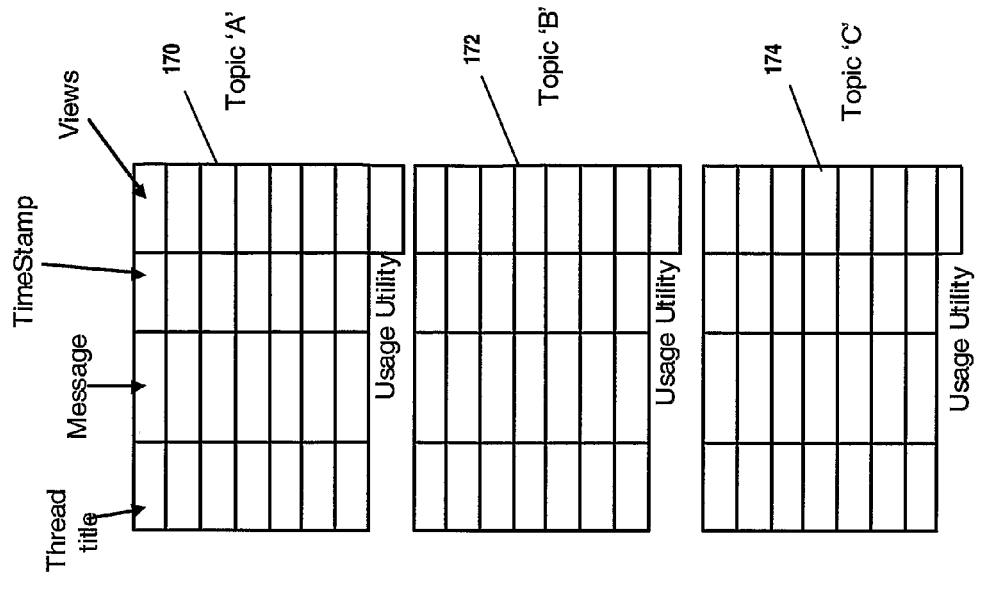
FIG. 17 is a diagram illustrating sets of data which may be stored and used in a third embodiment of the present invention.

FIG. 17 illustrates various newsgroups threads, including the newsgroup messages and the time stamp of the data and/or time at which they were received. Different news groups 170, 172, and 174 are available for topics A, B, and C respectively.

Within this variant, content access data may be updated in one of two ways. In a first way, only the content access data which relates to the specific topic to which the user has contributed is updated. Thus, for example, if a user contributes to the news group 170 on topic A, then the topic access data set for topic A is updated.

Alternatively, in a second mechanism, if a user contributes to a first topic, then the content access data stored in respect of another topic may be updated. Thus, for example, should a user contribute to the news group 172 concerning topic B, then his content access data stored in respect of topic A may be updated. Note that this may be in addition to an update of the content access data in respect of topic B, or as an alternative thereto.

Thus, within this further embodiment, multiple sets of content access data may be stored in respect of different topics, and that content access data may be updated in response to contributions on the particular respective topics, or on other topics. The updating of the content access data in respect of contributions made to each topic may be performed by any of the mechanisms previously described in respect of the first and second embodiment, depending on the content access data format.

In a further variation of this embodiment, the content may again be split into different categories or sets, but respective content access data is only maintained for one or some of the sets. Where this is the case, preferably contributions to any of the sets result in an updating of the content access data, irrespective of whether the contribution was for the set to which the content access data particularly relates. An example of this would be where particular threads in a newsgroup are classified as being either 'news' or 'discussion' (the creator of each new thread is probably best placed to make this classification). All contributions to either type of thread are accounted for (i.e. receive some level of credit), but the content access data is only applied to the 'news'-type threads.

Such a variant has the advantage that all users can see fully up-to-date postings in the 'discussion' threads (which gives everyone the potential to effectively contribute—which they could not do if access were restricted), whereas viewing access to the 'news' threads is restricted through the content access data mechanism. We anticipate that preferential access to 'breaking news' within communities will often provide sufficient motivation so as to encourage participation throughout the newsgroup.

Two further example systems which may make use of multiple content access data sets will now be described. The first example is a Knowledge Management System.

This is a system that stimulates a community of users to share relevant, topical information (that has typically been externally-generated). Contributions are of two forms:
i) Submission of a relevant document (typically a technical paper, article, or scientific experimental results); and
ii) A critique, or comments on a submitted article.

A characteristic of this domain is that (over a period of time) all members of such communities occasionally find (or generate) relevant, topical information suitable for sharing with their peers. The degree of asymmetry amongst the peers is thus quite constrained.

In such an example system, the content access data calculation may deliberately exclude consideration of ratings received within a particular time period, such as the last month (say). This thus provides a simple mechanism designed to ensure that credit for contributions is delayed. Moreover, if the two forms of contribution are also accounted for separately, by maintaining separate content access data for each, then it is quite possible for a peer to see a recently-submitted and interesting document, but to be restricted from seeing the comments posted about it. Whereas (ordinarily) this might suddenly stimulate them to make 'critique' contributions on other articles, the knowledge that credit for contributions is delayed is more likely to ensure they contribute more regularly, rather than sporadically, and in response to a specific need).

A second example system is Community of Interest Fora. Modern on-line fora are often structured into distinct, but related topic areas. For example, a Britney Spears discussion forum may have distinct newsgroups covering:

breaking news
music discussions
tour reviews
collections/rarities
gossip
forum administration Members of the forum typically have expertise/knowledge in particular areas (or they can be required to contribute to an 'administration' thread (which may introduce/help newcomers to the forum)), and so they can choose a selected topic area as their nominated 'home' topic. They get complete visibility of the posts made in this topic, and their contributions there earn them limited (content access data based) access to the other topics.

The utility characteristics of the different topics generally varies greatly. eg 'breaking news' may have very high utility to many members, but the utility of a given post within it decreases rapidly with time (as the news filters out through other channels). Conversely, the 'collections/rarities' topic may have generally lower utility, but the utility of its posts may persist for much longer.

The utility characteristics of each topic can be estimated by measuring the frequency and type of requests. For example, requests to view the (albeit filtered) 'breaking news' topic might be far more frequent (and be performed by a far wider range of community members) than those of another topic. By monitoring the number of view requests, a measurement of the utility characteristics of each topic can be determined. The (measured) utility characteristics of each topic can then be used to determine an appropriate content access value for that topic. ie a person has a distinct content access data set for each topic.

Further modifications may be made to the described embodiments to provide additional embodiments of the invention, as described next.

For example, in the previously described embodiments we have described a simple rating system in which each requestor rates a review with a single number.

However, alternative more complex versions are possible in which:

- Requestors can rate the contributor separately from the contribution. This allows requesters to differentiate between content which (they feel) is simply of poor quality in this particular case, and contributors who they feel are systematically abusing the system.
- Ratings could allow separate rating of quality versus suspected selfish abuse (eg plagiarism) and versus suspected malicious abuse (eg restaurant owners slandering their competitors through publication of inaccurate reviews).
- Ratings could have many parameters such as whether the content is on-topic, timely, helpful, polite, legal, useful, well-written etc.

Moreover, for newsgroup-oriented applications (eg Community of Interest Fora, or a Technical Support Forum), a simplification may be possible. Within such applications users may rate a thread as a whole, rather than necessarily be expected to rate each (of the many, tightly-associated) contributions. Particularly helpful, or unhelpful, contributions to the thread may also be additionally rated in order that they receive a differing benefit.

Further modifications may also be made to the account holder mechanism used in the peer to peer embodiment described above. In particular, here the account holders mechanism can use other distribution schemes if, for a particular application, they are secure or more efficient. For example, the ratings of a contributed review may be stored, not in the Account Holders, but only in the Content Holders. In this scheme, the Requestor sends his rating only to the Content Holders who update an aggregate review rating (as long as the rating sent is valid and not duplicated). They then pass on this updated aggregate review rating to the Account Holder who uses this figure (rather than the raw rating) to update the Content Author's content access data For example, its content access data may then be based upon the maximum aggregate review rating received. The update of the rating in such a case is performed preferably by aggregating the number of positive ratings received, rather than using the exponentially smoothed average.

Additionally or alternatively, when the formulae used to update content access data are such that the access to data always increases (as will generally be the case) then the content Authors can hold their own content access data as signed tokens generated by their Account Holders. Then they can present this signed token with their requests which allows Content Holders to check the content access without querying an Account Holder.

Further modifications may also be made to the mechanism by which the aggregate quality ratings (AQRs) of each content item are calculated. More particularly, the particular AQR mechanism we outlined above is preferable because of its simplicity, and the fact that it can be used to weight (bias) the more recently-received ratings. It also requires minimal 'memory', because all prior review ratings can be discarded once the AQR is updated. But it has the disadvantage that '1 peer, 1 vote' policies can't be enforced.

To overcome any such problems, a slightly different scheme may be adopted in the peer to peer architecture in which:

i) Review ratings are only sent to the Account Holder (and not the Content Holder).

ii) Account Holder's are then able to respond to two sorts of queries on an account, as follows:

a) The content access data of the peer (as before); and
  b) The AQR for a particular report Content Holders may then (occasionally) query the Account Holders associated with content they hold, and the AQRs are then calculated by each of the Account Holders and then returned to the requesting Content Holder. This version of the scheme allows 'multiple votes' to be handled in the same ways as when determining the content access data, as described previously.

Further modifications may be made to the above described embodiments of the invention in accordance with the following. All the embodiments described previously can be supplemented with the following options. The first option, applicable for example to step 6.8 in FIG. 6, is to weight the rating data according to the current content access data value of the requesting user (or better), weight it according to the average rating received for the requesting user's recent content). This exploits the fact that users receiving high ratings for their own content are more likely to accurately assess the quality of others' content.

The second optional mechanism merely provides a simple incentive mechanism to actually perform the rating. In the first instance this requires that the cost of rating a piece of content is minimised. As well as the choice of rating scale and interface design, this may include ensuring that the rater's identity remains anonymous (at least to the author of the content—who's content access data the rating ultimately affects). In addition, a small positive incentive to rate content may be desirable. An insecure, but lightweight means to do this would simply be increment a user's content access data for each rating that they make. A more secure alternative— that would ensure that users took care in performing the rating—would be to statistically check that a particular user's ratings were generally in line with the other feedback received on that piece of content (and to penalise the content access data if not).

The invention claimed is:

1. A content item provisioning method, comprising the steps:
   storing content items for provision to users;
   maintaining, for at least one user, respective content access data usable to determine which stored content items may be provided to the users;
   receiving content items from a particular user for provision to the users;
   changing the respective content access data for said particular user from which content items are received; and
   providing a sub-set of the stored content items to said particular user, members of the sub-set being determined in dependence on the respective content access data of said particular user,
   wherein each stored content item has a property value, and the content access data comprises a content access value relating to the property value, wherein the sub-set of the content items is determined in dependence on the respective property values.

2. The method according to claim 1, wherein the property values and content access values are times and/or dates.

3. The method according to claim 1, wherein the property values and content access values are geographical positions.

4. The method according to claim 1, wherein multiple sets of content items are stored, and respective content access data is maintained for one or more of the sets of content items.

5. The method according to claim 4, wherein content access data for one set is changed in dependence on receipt from users of content items for that set.

6. The method according to claim 4, wherein content access data for one set is changed in dependence on receipt from users of content items for another set or sets.

7. The method according to claim 1, wherein the content access values are changed so as to increase the content items provided in the sub-set.

8. The method according to claim 1, wherein the content access values are changed to give a fixed change in the content items with which the users are provided in the sub-set.

9. The method according to claim 1, and further comprising the step of receiving rating data specifying a rating given to a content item by a user, wherein the changing step comprises changing the content access value for the user from which the content item which was rated was received in dependence on the received rating data.

10. The method according to claim 9, wherein the rating is weighted according to the content access value of the rating user.

11. The method according to claim 1, wherein the changing step further comprises receiving requests for specific content items from the users, and changing the content access value for the user from which the requested content item was received.

12. The method according to claim 1, wherein the changing step further comprises monitoring time or date at which a first content item is received in relation to the time or date a second content item is received, and changing the content access value of the user from which the first content item was received in dependence on a difference between the times and/or dates.

13. The method according to claim 1, wherein the changing step further comprises monitoring the time since the receipt of a content item and changing the content access value of the user from which the content item was received in dependence on the monitored time.

14. The method according to claim 1, and further comprising the step of permitting a user to perform manipulations of the stored content items in dependence on the user's content access value.

15. The method according to claim 1, collectively performed by at least a sub-set of peers within a peer to peer network.

16. A computer program or suite of computer programs stored on a computer module storage medium and arranged such that when executed by a computer system or a plurality of computer systems it/they cause the computer system or systems to perform the method of claim 1.

17. A content item provisioning system, comprising:
   content storage arranged in use to store content items for provision to users;
   data storage arranged in use to store, for at least one user, respective content access data usable to determine which stored content items may be provided to the users;
   first receiving means for receiving content items from a particular user for provision to the users;
   a data processor arranged in use:
   i) to change the respective content access data for said particular user from which content items are received; and
   ii) determine a sub-set of the content items in dependence on the content access data of said particular user; and
   means for providing the determined sub-set to said particular user,
   wherein each stored content item has a property value, and the content access data comprises a content access value relating to the property value, wherein the sub-set of the content items is determined in dependence on the respective property values.

18. The system according to claim 17, wherein the property values and content access values are times and/or dates.

19. The system according to claim 17, wherein the property values and content access values are geographical positions.

20. The system according to claim 17, wherein multiple sets of content items are stored in the content storage, and respective content access data is stored in the data storage for each set of content items.

21. The system according to claim 20, wherein content access data for one set is changed in dependence on receipt from users of content items for that set.

22. The system according to claim 20, wherein content access data for one set is changed in dependence on receipt from users of content items for another set or sets.

23. The system according to claim 17, wherein the content access values are changed so as to increase the content items provided in the sub-set.

24. The system according to claim 17, wherein the content access values are changed to give a fixed change in the content items with which the users are provided in the sub-set.

25. The system according to claim 17, and further comprising means for receiving rating data specifying a rating given to a content item by a user from one or more users, wherein the data processor is further arranged to change the content access value for the user from which the content item which was rated was received in dependence on the received rating data.

26. The system according to claim 25, wherein the rating is weighted according to the content access value of the rating user.

27. The system according to claim 17, further comprising means for receiving requests for specific content items from the users, and the data processor is further arranged to change the content access value for the user from which the requested content item was received.

28. The system according to claim 17, further comprising a monitor to monitor time or date at which a first content item is received in relation to the time or date a second content item is received, wherein the data processor is further arranged to change the content access value of the user from which the first content item was received in dependence on a difference between the times and/or dates.

29. The system according to claim 17, further comprising a monitor to monitor the time elapsed since the receipt of a content item, the data processor being further arranged to change the content access value of the user from which the content item was received in dependence on the monitored time.

30. The system according to claim 17, and further comprising content item manipulation means arranged in use to permit a user to perform manipulations of the stored content items in dependence on the user's content access value.

31. The system according to claim 17, collectively embodied by at least a sub-set of peers within a peer to peer network.

32. A content item provisioning method, comprising the steps:
   storing data defining access to content items for provision to users;
   maintaining, for at least one user, respective content access data usable to determine which stored data defining access to content items may be provided to the users;
   receiving data defining access to content items from a particular user for provision to the users;
   changing the respective content access data for said particular user from which data defining access to content items are received; and
   providing a sub-set of the stored data defining access to content items to said particular user, members of the sub-set being determined in dependence on the respective content access data of said particular user,
   wherein each stored data defining access to a content item has a property value, and the content access data comprises a content access value relating to the property value, wherein the sub-set of the data defining access to content items is determined in dependence on the respective property values.

33. A content item provisioning system, comprising:
   content storage arranged in use to store data defining access to content items for provision to users;
   data storage arranged in use to store, for at least one user, respective content access data usable to determine which stored data defining access to content items may be provided to the users;
   first receiving means for receiving data defining access to content items from a particular user for provision to the users;
   a data processor arranged in use:
   i) to change the respective content access data for said particular user from which data defining access to content items are received; and
   ii) determine a sub-set of the data defining access to content items in dependence on the content access data of said particular user; and
   means for providing the determined sub-set to said particular user,
   wherein each stored data defining access to content items has a property value, and the content access data comprises a content access value relating to the property value, wherein the sub-set of the data defining access to content items is determined in dependence on the respective property values.

* * * * *